United States Patent [19]
Wilfert

[11] 3,836,192
[45] Sept. 17, 1974

[54] BODY FOR VEHICLES, ESPECIALLY PASSENGER MOTOR VEHICLES

[75] Inventor: Karl Wilfert, Gerlingen-Waldstadt, Germany

[73] Assignee: Daimler-Benz Aktiengesellschaft, Stuttgart-Unterturkheim, Germany

[22] Filed: May 16, 1969

[21] Appl. No.: 825,215

[30] Foreign Application Priority Data
May 17, 1968 Germany............................ 1755512

[52] U.S. Cl. ................ 296/28 R, 293/62, 296/31 P
[51] Int. Cl. ........................ B60r 21/14, B62d 29/04
[58] Field of Search .......... 296/31, 31 P, 28 R, 1 R; 280/150 B; 293/62, 71 R

[56] References Cited
UNITED STATES PATENTS
1,392,889 10/1921 Day................................. 296/31 X
2,829,915 4/1958 Clareau......................... 296/28 UX
3,224,924 12/1965 Von Ardenne et al. .... 280/150 B X
3,290,082 12/1966 Fritsch............................. 293/71 X
3,494,607 2/1970 Rusch................................. 293/71

FOREIGN PATENTS OR APPLICATIONS
1,472,877 1/1967 France................................. 296/28
210,300 1/1924 Great Britain....................... 296/31

Primary Examiner—David Schonberg
Assistant Examiner—John A. Pekar
Attorney, Agent, or Firm—Craig & Antonelli

[57] ABSTRACT

A body vehicles, especially for passenger vehicles, in which the parts of the outer body which are endangered by impacts or which endanger others in case of accidents, are provided with a layer of plastic material, particularly with a layer of elastic and/or plastically yielding synthetic resinous material.

23 Claims, 13 Drawing Figures

PATENTED SEP 17 1974 3,836,192

INVENTOR
KARL WILFERT

BY
Craig, Antonelli, Stewart & Hill ATTORNEYS

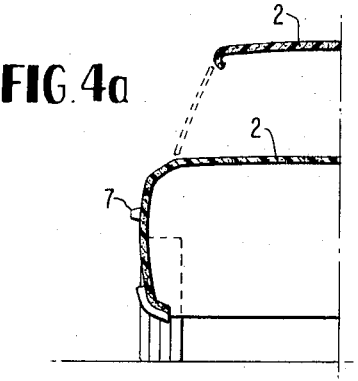
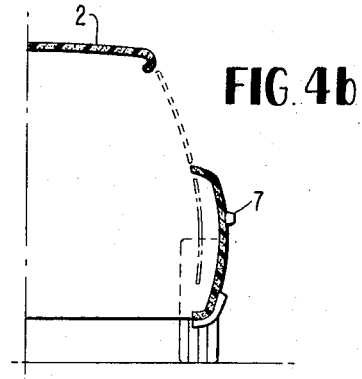
FIG. 4a  FIG. 4b
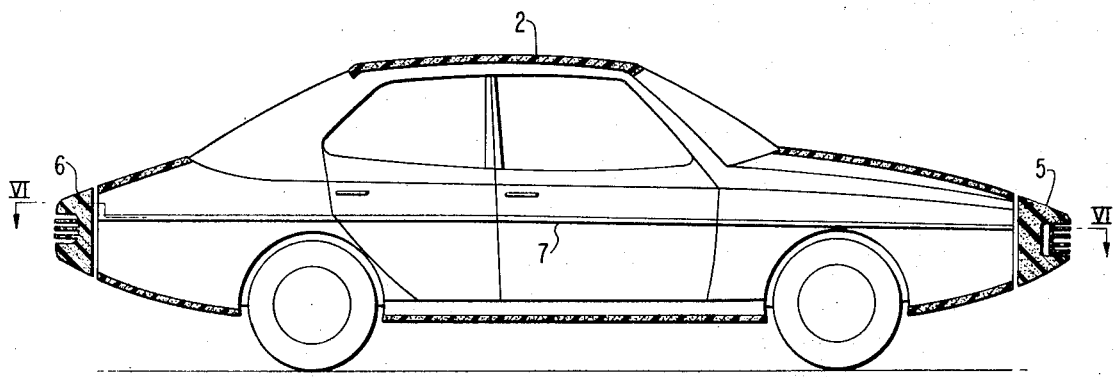
FIG. 5
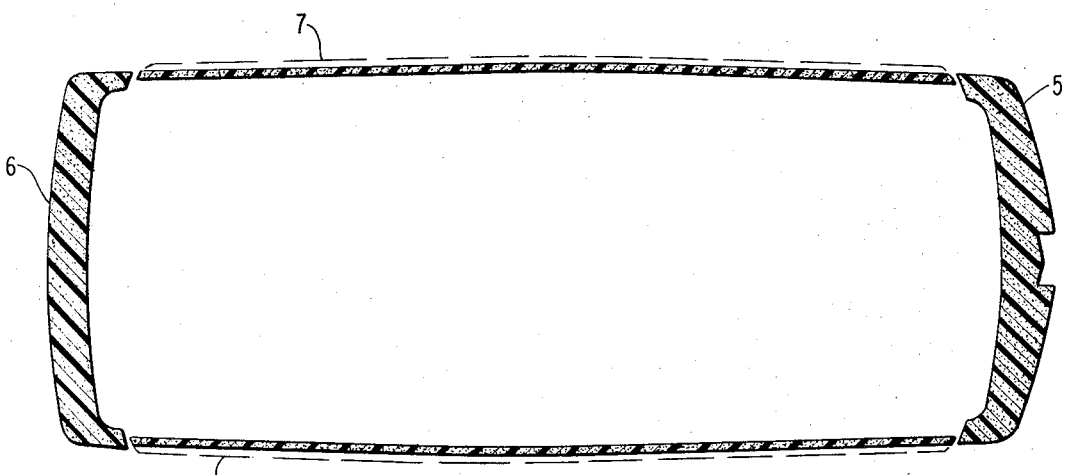
FIG. 6

INVENTOR
KARL WILFERT

BODY FOR VEHICLES, ESPECIALLY PASSENGER MOTOR VEHICLES

The present invention relates to a body for vehicles, especially for passenger motor vehicles, which is so constructed that the injury danger in case of accidents to other traffic participants seized by the vehicle, such as, for example, pedestrians or bicyclists, is kept as small as possible.

It is known that also pedestrians which are seized by a relatively slowly driving vehicle, are frequently seriously injured. Consequently, legal regulations have been issued already which prohibit the arrangement at the vehicle body of parts which in particular project and therewith endanger other traffic participants to a high degree.

However, it has been found that the measures taken heretofore in this domain are insufficient in order to assure an effective protection of other traffic participants in case of accidents.

Accordingly, the present invention is concerned with the basic purpose to produce a vehicle body which offers in case of accidents to other traffic participants, such as, for example, pedestrians and bicyclists, as well as also to the passengers of the vehicle, as far-reaching a protection as possible against injuries and which contributes during lesser collisions that the damages at the vehicle themselves remain smaller than with the vehicle body constructions used heretofore.

Consequently, a body for vehicles, especially for passenger motor vehicles is proposed in which, according to the present invention, at least essential parts, particularly impact-endangering and impact-endangered parts of the outer surface of the outer convering are covered with an elastic and/or plastically yielding synthetic resinous material, especially with a foam-material of any known, conventional type.

According to a preferred type of construction of the present invention, the synthetic resinous material layer is constructed thicker at particularly exposed places, such as, for example, corners, edges, and bumpers than in the other areas.

It may also be advantageous to construct in particular exposed places such as, for example, bumpers as conventional hollow chambers which are filled especially with air, gas or a liquid whereby the filling can escape in a conventional manner under impact effect.

According to a preferred type of construction of the present invention, the hardness of the synthetic resinous material layer decreases from the outside toward the inside. As a result thereof, a relatively resistant surface of a vehicle body according to the present invention is achieved which is wear-resistant and insensitive, for example, against scratches and similar small damages whereas the aimed-at buffer or cushion effect remains preserved.

However, it may also be advantageous if the hardness of the synethetic resinous material layer increases from the outside toward the inside because in that case, under certain circumstances, for example, the protection for the pedestrain seized by the vehicle may be greater.

The synthetic plastic material layer can thereby be so constructed that its hardness varies continuously over the layer thickness or that, on the other, also at least two synthetic resinous material layers of different hardness may be arranged one above the other.

It is furthermore advantageous if at least the lateral surfaces of the body according to the present invention are protected by a protective strip consisting of synthetic resinous material into which is inserted additionally a rubber strip.

Accordingly, it is an object of the present invention to provide a body for vehicles, especially for passenger motor vehicles which eliminates by simple means the shortcomings encountered in the prior art.

Another object of the present invention resides in a vehicle body which increases considerably the safety of other traffic participants such as pedestrians or bicyclists.

A further object of the present invention resides in a vehicle body which not only assures an effective protection to other traffic participants in case of accidents but which also protects the passengers of the motor vehicle to a considerable extent.

A still further object of the present invention resides in a vehicle body, especially passenger motor vehicle body which is relatively insensitive to minor scratches and damages and which also permits the elimination of certain time-consuming and costly manufacturing and repair operations necessary heretofore in connection with the outer body panels.

These and further objects, features and advantages of the present invention will become more obvious from the following description when taken in connection with the accompanying drawing which shows, for purposes of illustration only, several embodiments in accordance with the present invention, and wherein:

FIG. 4a and 4b are partial schematic transverse cross-sectional views taken in different planes through a modified embodiment of a passenger motor vehicle body in accordance with the present invention, the other half being in each case of symmetrical construction;

FIG. 5 is a schematic side elevational view of the motor vehicle body according to FIGS. 4a and 4b;

FIG. 6 is a horizontal cross-sectional view through the vehicle body taken along line VI—VI of FIG. 5;

Figure 1A:
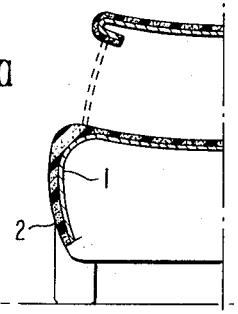
FIG. 1a and FIG. 1b are schematic, transverse cross-sectional views through a passenger motor vehicle body in accordance with the present invention, illustrating one-half of two slightly modified embodiments of a vehicle in accordance with the present invention of which the other half is of symmetrical construction.
Figure 1B:
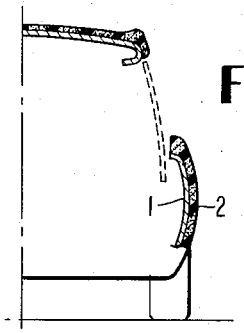
Figure 2:
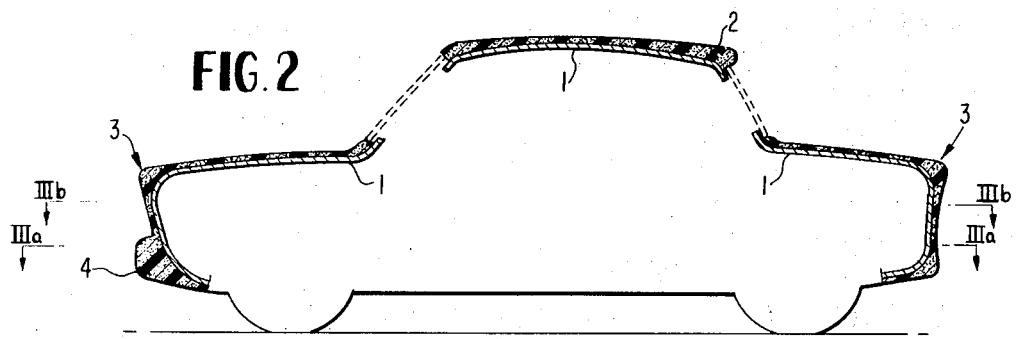
FIG. 2 is a longitudinal cross-sectional view through the motor vehicle body in accordance with the present invention illustrated in FIG. 1a or 1b.
Figure 3A:
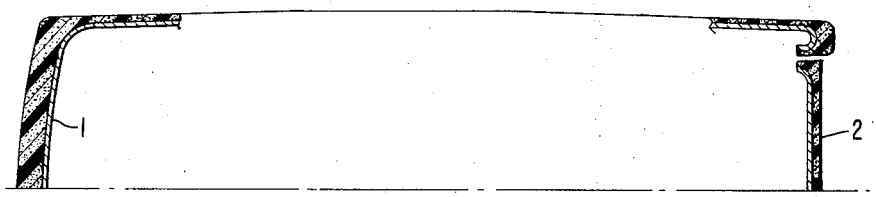
FIG. 3a and FIG. 3b are partial schematic horizontal cross-sectional views taken along lines IIIa—IIIa and IIIb—IIIb of FIG. 2, the other half being in each case of symmetrical construction.
Figure 3B:
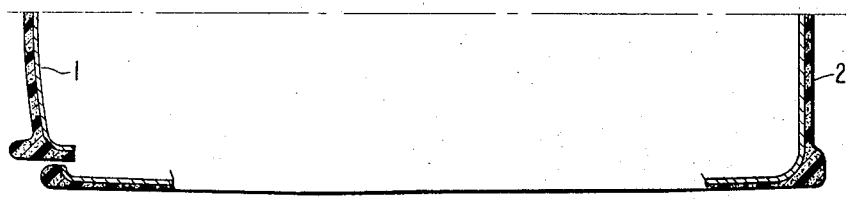
Figure 7A:
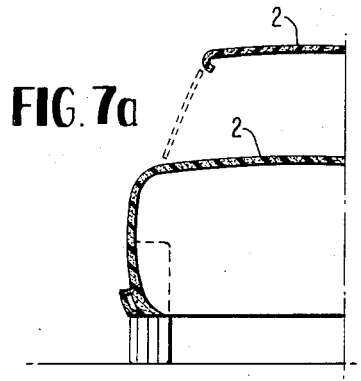
FIG. 7a and FIG. 7b are partial schematic transverse cross-sectional views taken in different planes through a further modified embodiment of a vehicle body in accordance with the present invention, the other half being in each case of symmetrical construction.
Figure 7B:
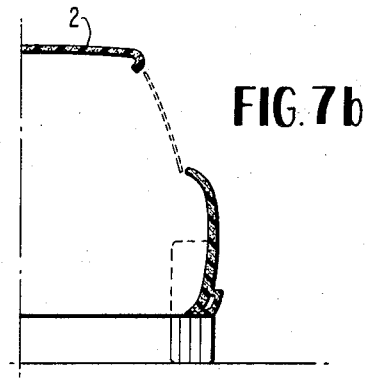

Referring now to the drawing wherein like reference numerals are used throughout the various veiws to designate like parts, and more particularly to FIGS. 1a, 1b, 2, 3a and 3b of the drawing, the outer covering of the body, consisting preferably of sheet metal, is indicated by reference numeral 1 and the synthetic resinous material layer arranged on the outer surface thereof by reference numeral 2. Reference numeral 3 designates generally particularly exposed edges of the body at which the plastic layer 2 is constructed particularly thick. Also, the bumper 4 is thereby made from the same synthetic resinous material.

In the embodiment illustrated in FIG. 5, in lieu of the customary bumpers, preferably readily interchangeable front and rear caps 5 and 6 are provided which at least during lesser collisions exert a strongly shock-absorbing or shock-damping effect.

For the further protection of the body, a protective strip 7 is provided which extends over the lateral surfaces of the body.

Figure 8:
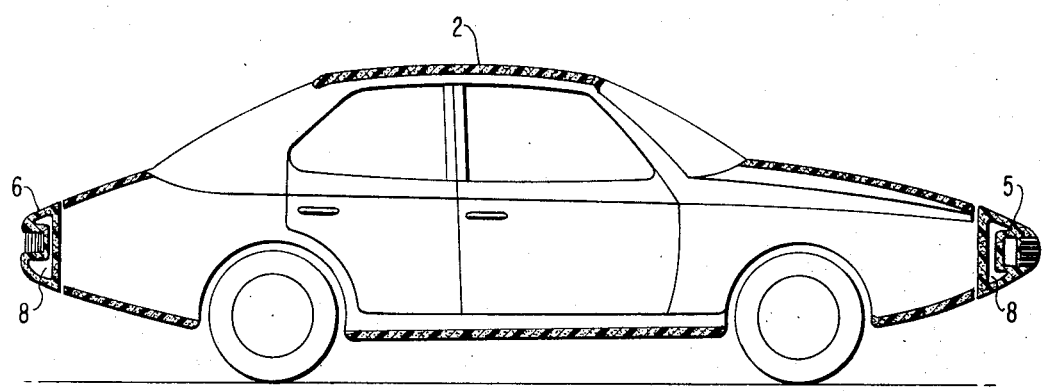
FIG. 8 is a side elevational view of the vehicle body illustrated in FIGS. 7a and 7b.
Figure 9:
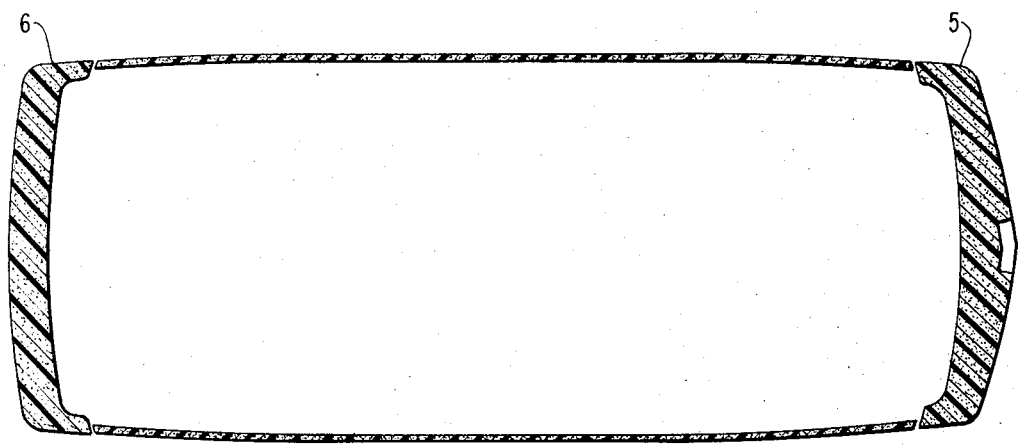
FIG. 9 is a horizontal cross section through the vehicle of FIG. 8.

In the embodiment of FIG. 8, the front and rear caps 5 and 6 are provided with hollow chambers 8 which are preferably filled with a medium that is able to escape under impact effect.

In addition to the particular safety for other traffic participants in case of accidents, the vehicle body according to the present invention entails still further advantages such as, for example, a very good sound and temperature insulation, the possibility to dispense with the enameling or painting, excellent corrosion protection, good repair possibilities as well as far-reaching possibilities in connection with the design of the form and shape of the vehicle.

While I have shown and described several embodiments in accordance with the present invention, it is understood that the same is not limited thereto, but is susceptible of numerous changes and modifications as known to a person skilled in the art. For example, the outer covering 1 of the body need not necessarily consist of sheet metal panels but in connection with parts subjected to lesser wear and tear may also consist of synthetic resinous material foils. Thus, it is obvious that the present invention is not limited to the details shown and described herein, and I therefore do not wish to be limited to the same but intend to cover all such changes and modifications as are within the scope of those skilled in the art.

I claim:

1. A body for vehicles, especially for passenger motor vehicles, characterized in that at least substantial parts of the outer surface of its outer body cover means are coated with a synthetic resinous material, the parts of the outer body cover means which are particularly impact endangering and impact-endangered are coated with said synthetic resinous material, and particularly exposed places are constructed with hollow chambers beneath the covering means which are filled with a fluid able to escape under impact effects.

2. A body according to claim 1, characterized in that said places are front bumpers.

3. A body according to claim 1, characterized in that said places are formed by front and rear cap means.

4. A body according to claim 1, characterized in that the synthetic resinous material coating is constructed thicker at particularly exposed places than in the other areas.

5. A body for vehicles, especially for passenger motor vehicles, characterized in that at least substantial parts of the outer surface of its outer body cover means are coated with a synthetic resinous material and that particularly exposed places are constructed with hollow chambers beneath the covering means which are filled with a fluid able to escape under impact effects.

6. A body according to claim 5 wherein said synthetic resinous material is elastic.

7. A body according to claim 5, wherein said synthetic resinous material is plastically yielding.

8. A body according to claim 5, wherein said synthetic resinous material is a foamed material.

9. A body according to claim 5, characterized in that the synthetic resinous material coating is constructed thicker at particularly exposed places than in the other areas.

10. A body according to claim 9, characterized in that said exposed places include corners, edges and bumpers.

11. A body according to claim 5, characterized in that the hardness of the synthetic resinous material coating decreases from the outside toward the inside of the vehicle body.

12. A body according to claim 5, characterized in that the hardness of the synthetic resinous coating increases from the outside toward the inside of the vehicle body.

13. A body according to claim 5, characterized in that the hardness of the synthetic resinous material coating changes continuously over the coating thickness.

14. A body according to claim 5, characterized in that at least two synthetic resinous material layers of different hardness are arranged one above the other to form said coating.

15. A body according to claim 5, characterized in that at least lateral surfaces of said body are protected by a protective strip consisting of synthetic resinous material.

16. A body according to claim 15, characterized in that a rubber strip is inserted into the protective strip.

17. A body according to claim 5, characterized in that said places are formed by front and rear cap means.

18. A body according to claim 5, wherein said outer body cover means includes sheet metal panels covering substantially all upwardly and laterally facing outer portions of said body, and wherein said coating is provided over substantially the entire area of said sheet metal panels.

19. A body according to claim 17, wherein said outer body cover means consists of sheet metal panel members.

20. A body according to claim 19, wherein the hardness of the coating decreases from the outside toward the inside of the vehicle body.

21. A body according to claim 19, wherein the hardness of the coating increases from the outside toward the inside of the vehicle body.

22. A body according to claim 19, wherein the hardness of the coating changes continuously over the coating thickness.

23. A body according to claim 19, wherein at least two synthetic resinous material layers of different hardness are arranged one above the other to form said coating.

* * * * *